United States Patent

Rushmere

[15] 3,647,388
[45] Mar. 7, 1972

[54] PROCESS FOR THE MANUFACTURE OF HYDROGEN CYANIDE

[72] Inventor: John Derek Rushmere, Wilmington, Del.

[73] Assignee: E. I. du Pont de Nemours and Company, Wilmington, Del.

[22] Filed: May 4, 1970

[21] Appl. No.: 34,119

[52] U.S. Cl................................23/151, 23/277, 23/284
[51] Int. Cl............................................C01c 3/02, B01j 1/00
[58] Field of Search.....................................23/151

[56] References Cited

UNITED STATES PATENTS 2,596,421   5/1952   McKinnis................................23/151

FOREIGN PATENTS OR APPLICATIONS 722,025   1/1955   Great Britain...........................23/151
816,731   7/1959   Great Britain...........................23/151

Primary Examiner—Oscar R. Vertiz
Assistant Examiner—Hoke S. Miller
Attorney—Robert W. Black

[57] ABSTRACT

A process for the manufacture of hydrogen cyanide from a gaseous hydrocarbon of up to six carbon atoms such as methane and ammonia is provided in which the gaseous hydrocarbon and ammonia react in a reaction zone at the flame front of a flame formed by the combustion of hydrogen with oxygen. The preferred process is carried out in a burner having a center conduit for the flow of an oxygen-bearing stream and one or more annular conduits adjacent the center conduit for the cocurrent flow of hydrogen, ammonia and the gaseous hydrocarbon, the conduits ending in a reaction chamber where the gaseous hydrocarbon and ammonia react at the flame front of the hydrogen and oxygen combustion flame.

13 Claims, 1 Drawing Figure

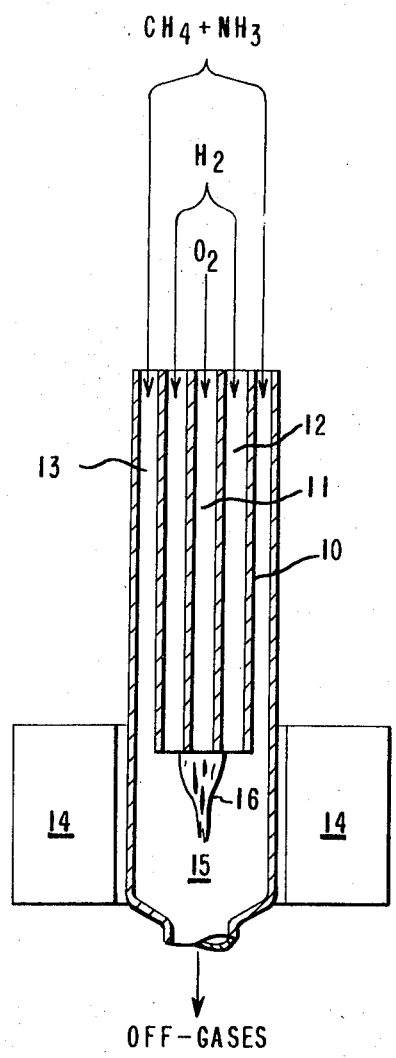

PROCESS FOR THE MANUFACTURE OF HYDROGEN CYANIDE

BACKGROUND OF THE INVENTION

1. Field of Invention

This invention relates to processes for the production of hydrogen cyanide, and more particularly to gas phase processes for the production of hydrogen cyanide by the reaction of a gaseous hydrocarbon and ammonia under the influence of a flame front.

2. Prior Art

Hydrogen cyanide is a very useful commercial chemical which finds application in the preparation of numerous, widely varied products. The extensive growth in demand for this chemical necessitates continuing innovation and improvement in the processes for its manufacture, and creation of new processes which are more economical than the existing processes.

The gas phase reaction of a gaseous hydrocarbon, such as an alkane hydrocarbon containing one to six carbon atoms, with ammonia is known in the art. Such a reaction is typically performed by mixing the reactive gases at high temperatures in the presence of a solid catalyst such as a metal of the platinum group. Illustrative of such processes are U.S. Pat. No. 3,379,500 to F. Albanese et al. (Apr. 23, 1968), U.S. Pat. No. 3,371,989 to B. Y. K. Pan (Mar. 5, 1968), U.S. Pat. No. 3,370,919 to B. Y. K. Pan (Feb. 27, 1968), U.S. Pat. No. 3,244,479 to B. Y. K. Pan et al. (Apr. 5, 1966), U.S. Pat. No. 3,215,495 to W. R. Jenks et al. (Nov. 2, 1965), and French Pat. No. 1,073,404 to Umberto Maffezzoni (Mar. 24, 1954). Such processes have in common the defects attendant on the use of a precious metal catalyst: high catalyst cost, catalyst poisoning, need for catalyst regeneration, and complexity of equipment.

A second type of process for the gas phase preparation of hydrogen cyanide utilizes an electrical discharge or arc to initiate and sustain the reaction. Examples of this technique are disclosed in U.S. Pat. No. 3,376,211 issued to Geir Bjornson on Apr. 2, 1968 and U.S. Pat. No. 3,169,914 issued to P. W. Young et al. on Feb. 16, 1965. Such techniques require very complex reactor design and are subject to rapid deterioration of the electrodes.

In a third type of process for the gas phase preparation of hydrogen cyanide the reactive gases are contacted with a heated, fluidized bed of refractory particles. This process is illustrated by U.S. Pat. No. 3,370,918 issued to J. W. Begley on Feb. 27, 1968. Such a process is cumbersome, requires relatively massive equipment, and tends to introduce particulate contaminants into the product gas.

SUMMARY OF THE INVENTION

According to the present invention there is provided a process for the production of hydrogen cyanide which comprises contacting and reacting in a reaction zone maintained at a temperature within the range of about 1,000° to 1800° C. a gaseous hydrocarbon of up to six carbon atoms and ammonia at the flame front of a flame formed by the combustion of hydrogen with oxygen.

BRIEF DESCRIPTION OF THE DRAWING

The drawing is a diagrammatic side view of a burner apparatus for use in carrying out the preferred process of the present invention.

DETAILED DESCRIPTION OF THE INVENTION

The mechanism of the reaction between a gaseous hydrocarbon, for example, methane, and ammonia is not well understood. The initial formation of free radicals is believed to be important and this has normally been accomplished in the prior art by heating the reacting gases and contacting them with a catalyst such as platinum, as noted above. Methane and ammonia react according to the equation:

$$CH_4 + NH_3 = HCN + 3H_2 - 60 \text{ kcal. at } 1,100° \text{ C.}$$

The heat required to sustain this endothermic reaction is provided in the prior art by heating of the reaction chamber, or of refractory particles, or by an electrical arm or plasma stream or by combustion of part of the reaction gases themselves.

In the process of the present invention no catalyst or other solid material is used and, under ideal adiabatic reaction conditions, no external heating of the reaction chamber is required. Heat to sustain the reaction is provided by the combustion, in the reaction chamber, of hydrogen with oxygen. A mixture of the synthesis gases, methane and ammonia, is brought into contact with the hydrogen-oxygen flame front through the effect of which free radicals are generated in the synthesis gas and the necessary heat is provided. Thus the flame front replaces both the catalyst and the heat source. The synthesis and combustion reactions are carried out simultaneously but separately. The synthesis reaction cannot effectively be carried out within or through the flame but rather must be carried out in contact with the flame front.

An inherent advantage of the process of this invention is apparent from the reaction shown above. The synthesis reaction to form hydrogen cyanide liberates 3 moles of hydrogen for each mole of hydrogen cyanide, and part of the hydrogen so formed can be recycled as fuel to the process. Under true adiabatic conditions the combustion of only 2 moles of hydrogen is required to sustain the reaction of 1 mole each of methane and ammonia at 1,100° C.; thus, ideally, the process produces more hydrogen than it consumes. By the use of a hydrogen-rich flame, combustion of oxygen is complete at the interface of the flame with the synthesis gas mixture and the flame is thereby utilized only as a source of heat and producer of free radicals.

The equipment preferred for reaction in the process of this invention is a burner 10 such as shown in the drawing consisting of a central conduit 11 surrounded by one or more annular conduits 12 and 13, all of the conduits discharging into an enlarged zone of reaction and combustion 15. Generally, it is preferred that oxygen be fed to the center conduit 11, hydrogen to the first adjacent annular conduit 12 and the methane-ammonia synthesis gas mixture to the outer annular conduit 13, although other combinations of the various gases and the different annuli can also be employed, as is shown in the examples below. In the laboratory it has been found helpful to surround the reaction zone with a furnace 14 to minimize heat losses through the walls of the reactor. The need for this practice, however, is not anticipated on an industrial scale where the use of much larger equipment and gas-flow enables adiabatic reaction conditions to be more nearly obtained.

Although methane is the preferred hydrocarbon because of its ready availability, good reactivity, and advantageous economics, numerous other normally gaseous hydrocarbons are also useful in the process of this invention. These include saturated hydrocarbons such as ethane, propane, and the butanes, and unsaturated hydrocarbons such as ethylene, propylene, and acetylene, and mixtures of these compounds. Generally, any normally gaseous hydrocarbon containing up to six carbon atoms per molecule can be used. Normally liquid hydrocarbons such as pentane, hexane, cyclohexane, and benzene, can also be utilized by first converting them to vapor in a suitable apparatus.

The oxygen for combustion will be contained in an oxygen-bearing stream of oxygen or of air or of mixtures of oxygen and air, namely enriched air. Other essentially inert gases to the combustion reaction such as carbon monoxide or carbon dioxide can be contained in the oxygen-bearing stream, as well as the other streams, without departing from the scope of the invention.

The temperature in the reaction zone for the synthesis reaction is within the range of about 1,000° to 1,800° C., but generally around 1,000° to 1,200° C.

While catalysts are generally necessary in other hydrogen cyanide processes, it has been found in the present process that a platinum-type catalyst in the reaction zone has no effect on hydrogen cyanide productivity.

The preferred process uses a synthesis mix containing about 1 mole each of ammonia and methane to be reacted at a flame front formed from the combustion of about 2 moles of hydrogen and 1 mole of oxygen; however, the proportions of the gases can vary depending upon the composition of each gas stream used, the degree of preheat and the desired conversion to a desired product composition. Generally, when essentially pure gases are used in the preferred process, the molar ratio of hydrogen to oxygen is within the range of about 1.5–2.5:1 the molar ratio of gaseous hydrocarbon to ammonia is within the range of about 1–2:1 and the molar ratio of the hydrogen plus oxygen to gaseous hydrocarbon plus ammonia is within the range of about 0.8–1.8:1.

The process of the present invention has the advantages of eliminating the use of catalyst, using equipment which is relatively simple, and avoids the introduction of contaminants. The process of this invention has as an additional advantage the production of hydrogen byproduct from the primary reaction which can be recycled to feed the flame front and, with excess hydrogen, encourages complete combustion of the oxygen.

The process of the present invention will be better understood by reference to the following examples in which parts and percentages are by weight unless otherwise indicated. In the examples, all gas volumes are given at standard temperature and pressure conditions.

EXAMPLE 1

The reaction was performed in the multiannular equipment described above and shown in the drawing, with the reaction chamber surrounded by a temperature-controllable induction furnace. A flow rate of 200 cc./min. of oxygen was introduced into the center conduit and a 400 cc./min. flow of hydrogen into the first annulus, and ignition was provided. A mixture of 238 cc./min. of methane and 231 cc./min. of ammonia was then introduced into the outer annulus. By introducing the various gases into the reaction chamber in this configuration, the methane-ammonia synthesis gas mixture was placed external to, but in intimate contact with, the hydrogen-oxygen combustion flame. Heat losses from the equipment were made up by controlling the furnace to maintain the temperature within the reaction chamber at approximately 1,080° C. The product gas was scrubbed with dilute sulfuric acid to remove ammonia and then dilute caustic soda to collect hydrogen cyanide. Cyanide was determined in the caustic liquor by titration with silver nitrate and it was determined that hydrogen cyanide yield rate of 2.46 gms./hr. has been produced. Based on the volume of the flame chamber, this amount of hydrogen cyanide corresponded to a productivity of about 800 pounds of hydrogen cyanide per cubic foot per day. Such a rate corresponds with commercially acceptable productivity rates.

EXAMPLE 2

The same flow rates of the individual gases were used as in Example 1; however, the methane was introduced into the first annulus along with the hydrogen. The temperature was again maintained at 1,080° C. The hydrogen cyanide yield was found to be 2.42 gms./hr. This example illustrates that the gaseous hydrocarbon can be introduced separately from the ammonia and into the first annular conduit with no loss of hydrogen cyanide productivity.

EXAMPLE 3

The conditions for this example were the same as for Example 2 except that this time the ammonia, instead of the methane, was introduced with the hydrogen. Also, in this example the operating temperature was reduced to 1,040° C. Hydrogen cyanide productivity was 1.96 gms./hr. Thus, it is seen that the ammonia too can be effectively introduced with the hydrogen and separately from the methane.

EXAMPLE 4

The gas flow rates used were the same as in Example 1; however, now the hydrogen, ammonia, and methane were all mixed together and introduced through the first annulus. The temperature was 1,080° C. The productivity rate of hydrogen cyanide was found to be 2.23 gms./hr., illustrating that both components of the synthesis gas mixture can be effectively introduced with the hydrogen into the stream surrounding the oxygen stream.

It is to be noted that in all the above examples the synthesis gases were in contact with, but not within nor a part of, the combustion flame. It has been found that such contact with the flame front is a necessary condition for the effectiveness of the present invention. If it is attempted to pass the synthesis gases through the hydrogen-oxygen flame front, productivity of hydrogen cyanide is reduced. This effect is illustrated in the following Controls A and B:

CONTROLS A AND B

In these controls the gas flow rates were the same as in Example 1 and the temperature was maintained at 1,070°–1,080° C. However, the disposition of the gas flows was as shown in Table I.

TABLE I

GAS FEED TO CONDUITS

| Control No. | Center | Middle Annulus | Outer Annulus | HCN Yield, g./hr. |
|---|---|---|---|---|
| A | $H_2+CH_4$ | $O_2$ | $NH_3$ | 0.48 |
| B | $CH_4+NH_3$ | $H_2$ | $O_2$ | 0.26 |

Controls A and B show that when either the methane or the methane-ammonia mixture was introduced through the flame, by introducing it via the center conduit, productivity of hydrogen cyanide was reduced.

What is claimed is:

1. A process for the production of hydrogen cyanide which comprises contacting and reacting in a reaction zone maintained at a temperature within the range of about 1,000° to 1,800° C. a gaseous hydrocarbon of up to six carbon atoms and ammonia at the flame front of a flame formed by the combustion of hydrogen with oxygen.

2. The process of claim 1 wherein the gaseous hydrocarbon is methane.

3. The process of claim 1 wherein the reaction is conducted at a temperature within the range of about 1,000°–1,200° C.

4. The process of claim 2 wherein the hydrogen and oxygen combustion uses excess hydrogen.

5. The process of claim 4 wherein the molar ratio of hydrogen to oxygen is within the range of about 1.5–2.5:1 the molar ratio of gaseous hydrocarbon to ammonia is within the range of about 1–2:1, and the molar ratio of hydrogen plus oxygen to gaseous hydrocarbon plus ammonia is within the range of about 0.8–1.8:1.

6. A process for the production of hydrogen cyanide which comprises igniting in a reaction zone a gaseous mixture composed of hydrogen and oxygen to form a combustion flame; flowing a gaseous hydrocarbon of up to six carbon atoms and ammonia in at least one annular stream so as to be introduced and contacted with said combustion flame front and reacting said gaseous hydrocarbon and said ammonia at said flame front at a reaction zone temperature within the range of about 1,000° to 1,800° C.

7. The process of claim 6 wherein said combustion flame is maintained by flowing an oxygen-bearing gas stream into said flame and flowing hydrogen into said flame as an annular stream adjacent and cocurrent to the oxygen-bearing stream;

said gaseous hydrocarbon and ammonia are reacted at said combustion flame front by flowing a mixture of said gaseous hydrocarbon and ammonia to said front as an annular stream adjacent and cocurrent to said hydrogen annular stream.

8. The process of claim 7 wherein the ammonia is mixed with the hydrogen stream and the gaseous hydrocarbon is flowed separately to the combustion flame front.

9. The process of claim 7 wherein the gaseous hydrocarbon is mixed with the hydrogen stream and the ammonia is flowed separately to the combustion flame front.

10. The process of claim 7 wherein both the ammonia and gaseous hydrocarbon are mixed with the hydrogen stream.

11. The process of claim 6 wherein the gaseous hydrocarbon is methane.

12. The process of claim 6 wherein heat is supplied externally to the reaction zone to supplement the heat generated by the combustion of hydrogen and oxygen.

13. The process of claim 7 wherein the gaseous hydrocarbon is methane and the molar ratio of hydrogen to oxygen is within the range of about 1.5–2.5:1, the molar ratio of methane to ammonia is within the range of about 1–2:1 and the molar ratio of the hydrogen plus oxygen to methane plus ammonia is within the range of about 0.8–1.8:1.

* * * * *